(12) United States Patent
Coots

(10) Patent No.: US 6,807,909 B1
(45) Date of Patent: Oct. 26, 2004

(54) METHOD AND APPARATUS FOR DEPOSITING RAILROAD PLATES ALONG A RAILROAD TRACK BED

(76) Inventor: William R. Coots, 115 Country Manor, Sheperdville, KY (US) 40165

( * ) Notice: Subject to any disclaimer, the term of this patent is extended or adjusted under 35 U.S.C. 154(b) by 0 days.

(21) Appl. No.: 10/465,192

(22) Filed: Jun. 19, 2003

(51) Int. Cl.[7] .................................................. E01B 3/00
(52) U.S. Cl. ........................................................ 104/16
(58) Field of Search ................................... 104/2, 5, 16

(56) References Cited

U.S. PATENT DOCUMENTS

| | | |
|---|---|---|
| 567,232 A | 8/1896 | Greenshield |
| 594,731 A | 11/1897 | Dowe |
| 636,702 A | 11/1899 | Wilton |
| 712,167 A | 10/1902 | Wood |
| 832,332 A | 10/1906 | McDonnell |
| 1,593,423 A | 7/1926 | Bradley |
| 2,762,313 A | 9/1956 | Sublett |
| 3,943,858 A | 3/1976 | Dieringer |
| 4,168,771 A * | 9/1979 | Krivec ...................... 193/35 A |
| 4,241,663 A | 12/1980 | Lund |
| 4,691,639 A * | 9/1987 | Holley ........................ 104/16 |
| 4,942,822 A * | 7/1990 | Cotic ........................... 104/16 |
| 4,974,518 A | 12/1990 | Cotie |
| 5,655,455 A | 8/1997 | Smith |

* cited by examiner

Primary Examiner—S. Joseph Morano
Assistant Examiner—Robert J. McCarry, Jr.
(74) Attorney, Agent, or Firm—Liniak, Berenato & White, LLC

(57) ABSTRACT

An apparatus partially carried on and partially towed behind a railroad track mounted highway truck or box car for conveying tie plates from the truck or car for deposit in a predetermined spaced apart sequence along the bed of a railroad track as the truck or car and the apparatus move in unison along the track. A method executed by this apparatus is also disclosed.

10 Claims, 6 Drawing Sheets

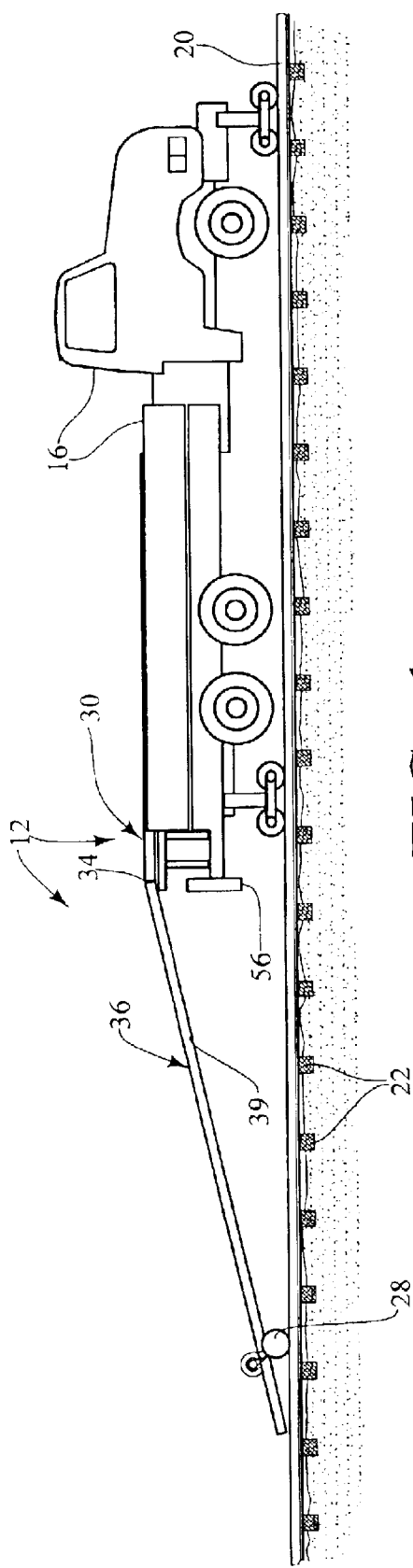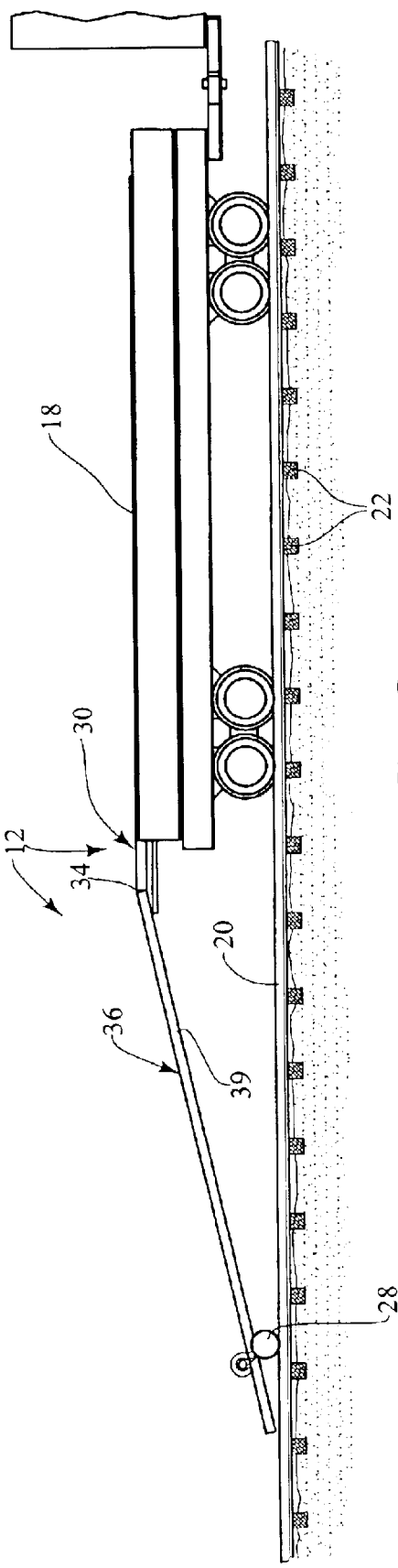

METHOD AND APPARATUS FOR DEPOSITING RAILROAD PLATES ALONG A RAILROAD TRACK BED

BACKGROUND OF THE INVENTION

This invention relates generally to an apparatus for conveying railroad tie plates placed thereon from the bed of a railroad track mounted highway truck or railroad car to the bed of a railroad track in a predetermined and spaced apart sequence as the apparatus and the truck or car move in unison along the track.

Machines which apply or drive tie plates to or on railroad ties have long been known in the prior art. See, for example, U.S. Pat. No. 567,232 granted to W. H. Greenshield on Sep. 8, 1896, U.S. Pat. No. 594,731 granted to G. W. Dowe on Nov. 30, 1897 and U.S. Pat. No. 636,702 granted to G. R. Wilton on Nov. 7, 1899. These and other such patents relate to machines which affix or secure tie plates to railroad ties.

But there has been a long felt need in the railroad art for an apparatus which can deposit tie plates, one at a time, on and along the bed of a railroad track at convenient spaced apart positions so that, later, as old railroad rails and tie plates are removed, the previously deposited new tie plates can be readily handled and substituted in place of the old tie plates, preparatory to laying new rails. Since each railroad tie requires a pair of such tie plates, one under each rail, it would be convenient to deposit one of such pair of replacement tie plates on a tie, centered between the rails, and the other, so as to be approximately centered between that tie and the next succeeding tie and also centered between the rails. According to the present custom, ties are located on successive longitudinal centerlines which are about 22 inches apart on a straight course of track in the United States. Thus, it would be desirable to provide an apparatus for depositing such replacement plates about eleven inches apart along the centerline of a railroad track. This will readily permit a worker to reach any two successively deposited tie plates for replacement of the two old tie plates on a nearest one of the railroad ties, preparatory to replacing the rails thereon.

By means of my invention, this particular long felt need in the prior art can now be met.

SUMMARY OF THE INVENTION

It is an object of my invention to provide an apparatus and method for conveying railroad tie plates from storage on a railroad track mounted carrier to the bed of a railroad track in a predetermined, spaced apart sequence as the apparatus and carrier move in unison along the track.

Briefly, in accordance with this object, a method for depositing tie plates in a spaced apart sequence along a bed of a railroad track from a mobile tie plate carrier mounted on the track is provided. The steps of the method include providing a gravity feed roller conveyor, an upper end portion of which is mounted in a tie plate receiving position on the carrier. A lower tie plate discharging end portion of the roller conveyor is attached to support structure carried by a pair of railroad wheels mounted on the track for movement with the carrier. The method further includes loading the plates, one after another, on the upper end portion of the roller conveyor such that the tie plates gravitate toward the lower end portion. The method also includes capturing each of the tie plates separately and in sequence as it gravitates down the roller conveyor to a preselected position on the roller conveyor near a discharge end of the lower end portion. The method additionally includes releasing each of the tie plates, following the step of capturing it, at a predetermined rate which depends on the distance traveled along the track by the pair of wheels since release of an immesiately preceding one of the tie plates such that successive ones of the tie plates can gravitate off of the discharge end onto the track bed at predetermined spaced apart positions as the carrier and conveyor move along the track.

These and other objects, features and advantages of the present invention will become apparent to those skilled in the art from the following detailed description and attached drawings which, by way of example, only a preferred embodiment of my invention is explained and illustrated.

BRIEF DESCRIPTION OF THE DRAWINGS

FIG. 1 shows a side elevation view of a conventional railroad track mounted highway truck containing and towing a novel apparatus for unloading tie plates from the truck along a railroad track, thus illustrating a preferred embodiment of my invention.

FIG. 2 shows a side elevation view of a conventional open top railroad car containing and towing the same tie plate unloading apparatus as shown in FIG. 1.

DESCRIPTION OF THE PREFERRED EMBODIMENT

Figure 3:
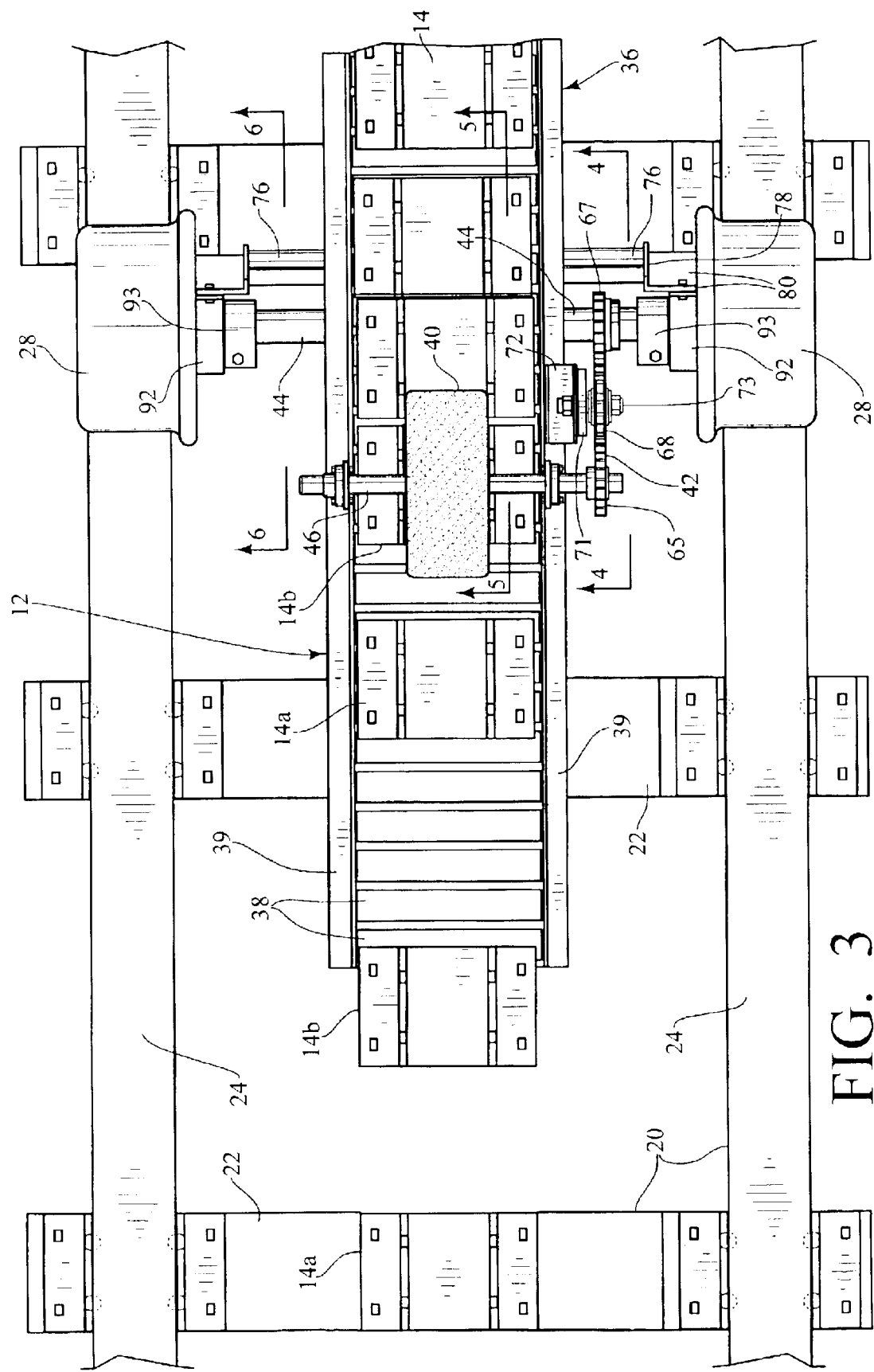
FIG. 3 shows a top plan view of a tie plate unloading end portion of the apparatus of FIGS. 1–2.

Referring now to the drawing figures, there is shown in a preferred embodiment of my invention, a conveyor apparatus, generally designated 12, for sequentially unloading railroad tie plates 14 from a suitable tie plate carrier, such as a railroad track mounted truck 16, as shown in FIG. 1, or a modified box car 18 as shown in FIG. 2. As best shown in FIG. 3, the. apparatus 12 is adapted to deposit the plates 14 along a railroad track 20. More specifically, I prefer to adapt the apparatus 12 to deposit one of the plates 14 every eleven inches along a centerline of the track 20. Conventionally, a straight portion of the track 20 will have cross ties 22 laid on longitudinal centerlines which are about twenty two inches apart, as measured along track rails 24.

The apparatus 12 will then deposit every other one of the plates 14 on each of the cross-ties 22, as at 14a in FIG. 3, and the remaining plates mid-way between each of the ties, as at 14b in FIG. 3. An individual workman who follows behind the apparatus 12 will then find it easy to reach any adjacent pairs of the plates 14 to replace old tie plates on each individual tie 22 after the old rails 24 have been removed, preparatory to placement of new rails on the newly placed tie plates.

Figure 9:
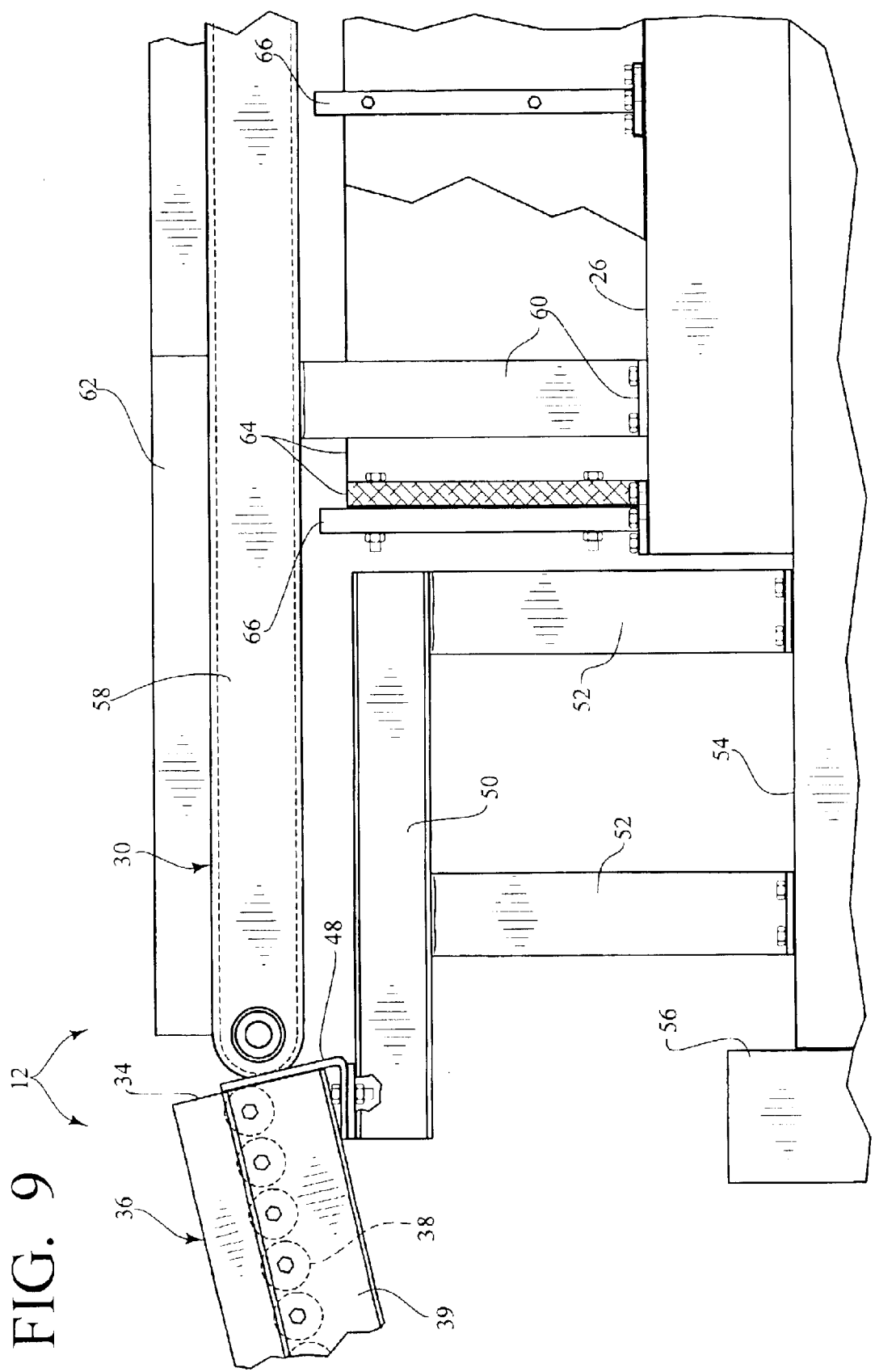
FIG. 9 shows a side elevation view of a tie loading end portion of the apparatus of FIGS. 1–8 projecting from a rear end portion of the truck of FIG. 1.
Figure 10:
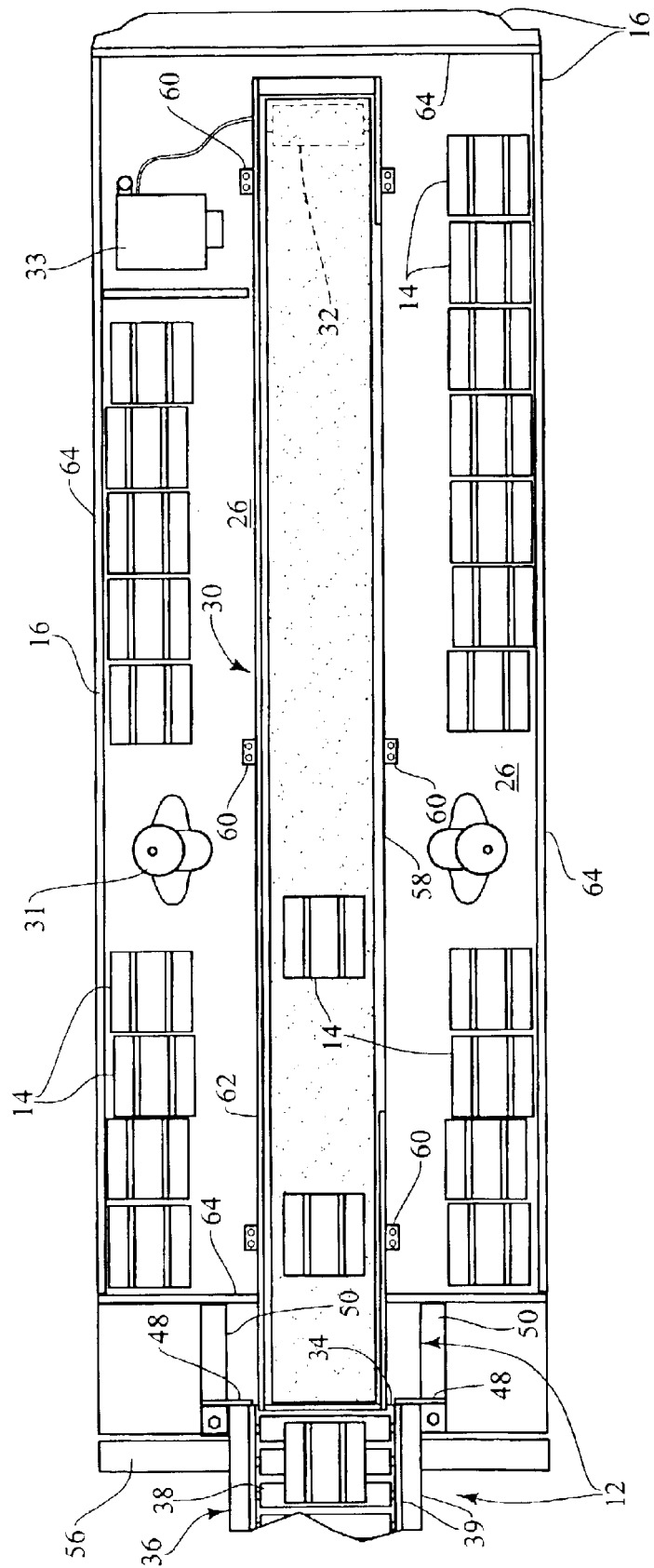
FIG. 10 shows a top plan view of a tie loading end portion of the apparatus of FIGS. 1–9 mounted on a bed of the truck of FIG. 1.

The conveyor apparatus 12 includes a tie loading end portion, which is mounted on the bed 26 of the truck 16, for example, as is shown best in FIGS. 9–10, and a tie unloading end portion which is supported on railroad wheels 28, as best shown in FIGS. 1, 2 and 3. The tie loading end portion of the apparatus 12 can include a conventional motorized endless belt conveyor, generally designated 30, for transporting the plates 14 rearwardly (from right to left, as viewed) from a front and mid-portion to a rear portion of the truck bed 26. The conveyor 30 can be positioned at a convenient height above the bed 26 so that one or, perhaps, two workers 31 (FIG. 10) standing on opposite sides of the conveyor 30, can readily pick up the tie plates 14 from storage along each side of the bed 26 (See FIG. 10), place them on the moving belt conveyor 30 and, preferably, orient them for disposition on the track 20 as shown in FIG. 3. A drive motor 32 for the belt conveyor 30 can be of the usual 12 vdc electric type so as to be energized by an engine driven electrical system of the truck 16. But, in order to avoid overtaxing a battery of the truck 16, it is preferred to use a separate gasoline powered motor/generator set 33 (See FIG. 10) to power a 120 vac drive motor 32 of the belt conveyor 30. Where the box car 18 of FIG. 2 is used for carrying the loading end portion of the apparatus 12, a suitable gasoline powered motor/generator set, can also be used as a satisfactory energy source for the drive motor of the conveyor 30.

The belt conveyor 30 delivers the tie plates 14 onto an upper input end 34 of a diagonally downwardly and rearwardly sloping gravity feed, roller conveyor, generally designated 36. The slope of the gravity feed roller conveyor 36 is suitable at about 10 to 15 degrees from horizontal. The roller conveyor 36 includes a series of parallel and closely spaced apart cylindrically shaped rollers 38 of conventional type which are freely rotatable about their longitudinal axes, as for example, on conventional bearings. The rollers 38 are suitably journaled in opposing and parallel extending side beams 39, which may be angle irons. The tie plates 14 thus are conveyed by gravity along the rollers 38 until intercepted by a device such as, for example, an inflatable pneumatic tire 40. The tire 40 is mounted above a central part of several of the rollers 38 and is connected by a gear chain 42 to an axle 44 of the railroad wheels 28 for rotation as a function of rotation of the railroad wheels. In the present example, the tire 40 can be a standard inflatable go cart slick, having 5½ inches in tread width and 6 inches in radius.

In the alternative, an inclined chute with a metal base could be substituted in place of the roller conveyor 36 provided it is operatively inclined at a sufficient angle to assure that the tie plates 14 placed on an upper input end thereof will readily slide downwardly along the base for individual capture by the tire 40 and subsequent release to the track bed. Clearly, the angle of incline in such a chute would need to be greater than that of the roller conveyor 36.

The tire 40 rotates with the railroad wheels 28 but in an angular direction which is opposite that of the rollers 38 when transporting the tie plates 14 thereon. As the tie plates 14 are gravity fed down the rollers 38, a tread of the tire 40 engages and bears downwardly on one of the plates at a time, thus pinning or capturing that plate against the underlying rollers. Upon initial engagement of the tire 40 with a given one of the plates 14, the tire must rotate a full 360 degrees on its axle 46 each time the railroad wheels 28 move the desired tie plate drop distance, i.e. every eleven inches in the present example, along the rails 24 where the tie plates are to be replaced under both of the rails 24 or every twenty two inches where the tie plates under only one of the rails are to be replaced. In this way, a different one of the tie plates 14 will pass completely under and become released from contact with the tire 40 each time the wheels 28 have moved eleven or twenty two inches along the tracks 24, as the particular case requires. After release of each of the plates 14 by the tire 40, the plate freely gravitates off of a lower output end of the roller conveyor 36 for disposition along a centerline of the tracks 24. I recommend that a discharge end of the roller conveyor 36 be positioned at a height of about 3–4 inches above the track bed such that the plates will not flip over or bounce out of the alignment as shown (FIG. 3). Accordingly, once the apparatus 12 is indexed so as to drop one of the plates 14, either on one of the ties 22, or mid-way between two adjacent ties, and the tire 40 is adjusted to make one full rotation while the wheels 28 are traveling a desired plate drop distance along the rails 24 the plates will thereafter be discharged with the desired spacing. The apparatus 12 will deposit all other ones of the plates 14 at the desired locations and with the desired spacing. As shown in FIG. 3, the plates 14 gravitating down the roller conveyor 36 will usually back up in front of the tire 40, one next to another, depending on how rapidly such plates are loaded onto the belt conveyor 30 and how rapidly the belt conveyor is moving to discharge them onto the roller conveyor.

It may be necessary to adjust the speed of travel of the belt conveyor 30 to synchronize closer to the speed of rotation of the tire 40, and, hence, the speed of rotation of the wheels 28 in order to prevent the plates 14 from backing up along the roller conveyor 36 in front of the tire all the way to the input end 34. A back-up of, say, about four of the plates 14 in front of the tire 40 at all times should assure even spacing between the plates being deposited along the track 20. Of course, sometimes the back-up might grow to seven or eight of the tie plates 14 while at other times the back-up might drop as low as two or three. A visual inspection of the back-up by workers standing in the bed 26 of the truck 16 will readily determine whether their rate of loading the tie plates 14 on the belt conveyor 30 is too great or too small or whether the speed of the belt conveyor 30 or, for that matter, the speed of the truck 16 along the track 20 should be increased or decreased. In many cases, merely reducing the rate at which the tie plates 14 are being placed on the conveyor 30 by the workman will prevent back up of the plates behind the tire 40 from becoming too great.

The side beams 39 at the upper end 34 of roller conveyor 36 are welded to a pair of angles 48 which are, in turn, bolted to an upper end portion of a pair of parallel and spaced apart support rails 50. See FIGS. 9–10. The beams 50 are welded on the upper end of support beams 52 which are, in turn, bolted to a rear end portion of a frame 54 of the truck 16 upon which a rear fender 56 is mounted. The belt conveyor 30 includes metal side panels 58. A series of support beams 60 are welded to the side panels 58 for supporting the belt conveyor at a convenient height above the truck bed 26. Parallel side walls 62 extending above and being welded to the side panels 58 assure that the tie plates 14 being placed on the belt conveyor 30 will not fall over the sides thereof and will be fed to the output end thereof for disposition on the rollers 38 at the upper input end of the roller conveyor 36. A plywood sidewall 64 secured to a series of spaced apart upright metal posts 66 encloses the truck bed 26 and extends along opposite sides, across a front end and under an output end of the belt conveyor 30. The posts 66 are of conventional type having metal plates at the base to accommodate bolts for fastening them to the truck bed 26 in any suitable manner.

Figure 4:
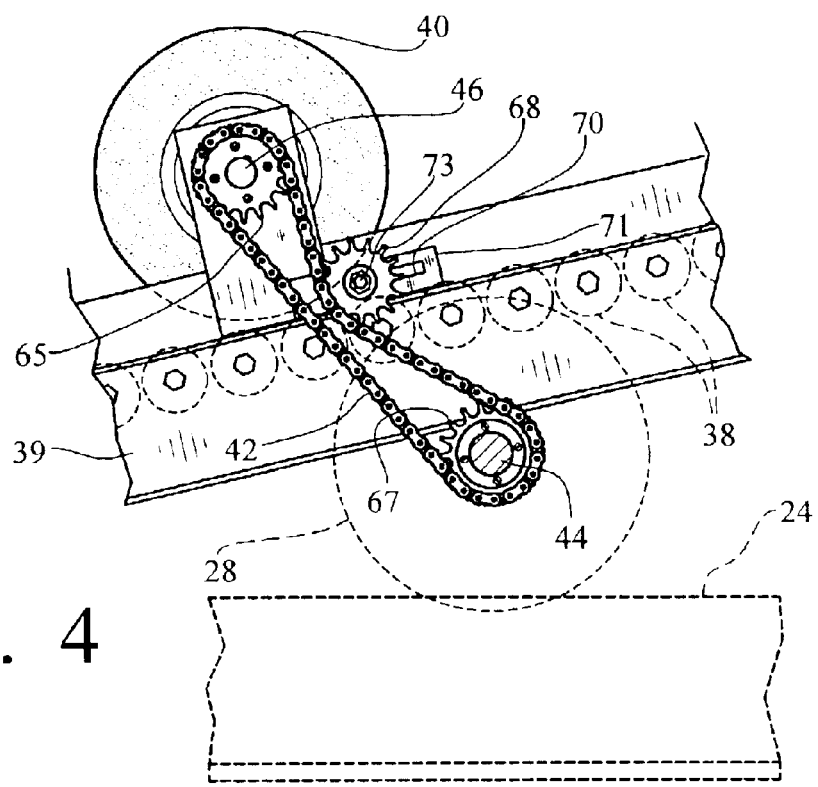
FIG. 4 shows a cross-sectional view of a portion of the apparatus of FIGS. 1–3, as viewed along cross-section lines 4—4 of the latter-mentioned figure.
Figure 5:
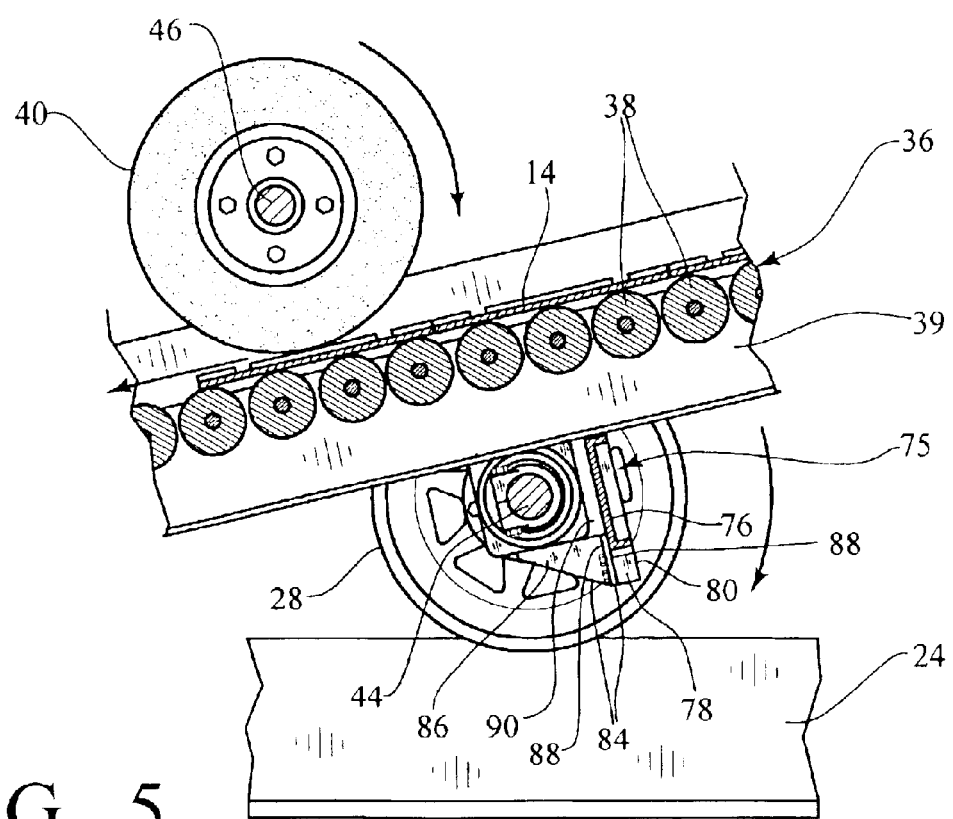
FIG. 5 shows a cross-sectional view of another portion of the apparatus of FIGS. 1–4, as viewed along cross-section lines 5—5 of FIG. 3.
Figure 6:
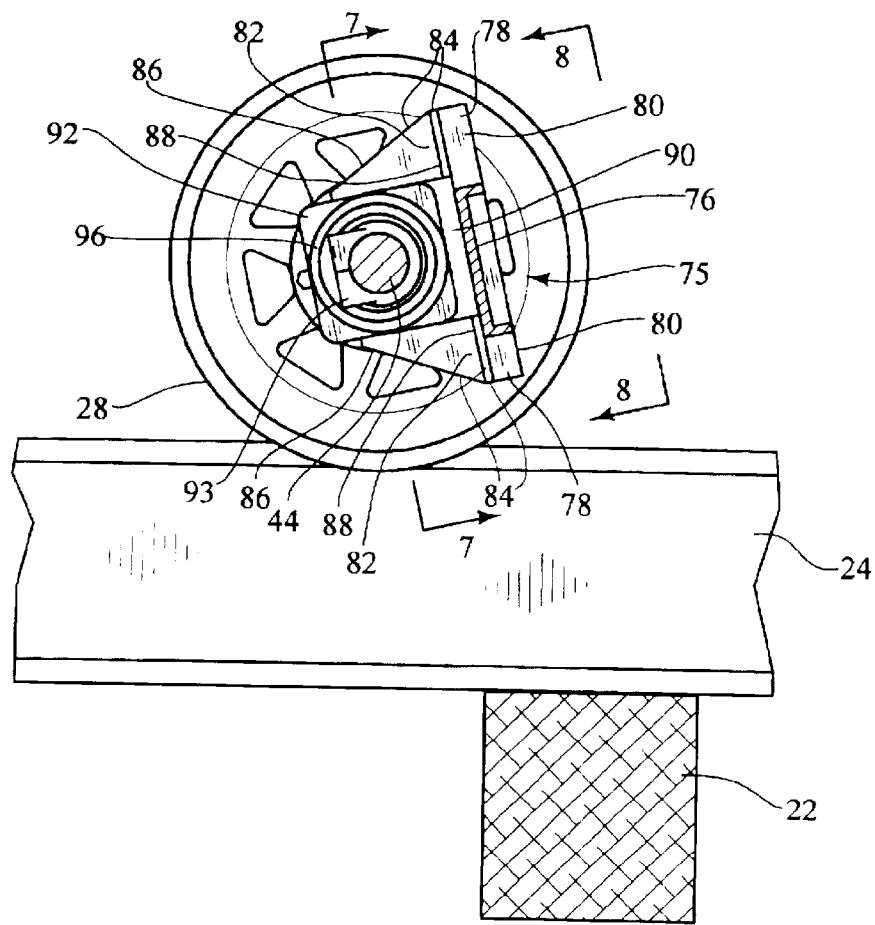
FIG. 6 shows a cross-sectional view of yet another portion of the apparatus of FIGS. 1–5, as view along cross-section lines 6—6 of FIG. 3.
Figures 7, 8:
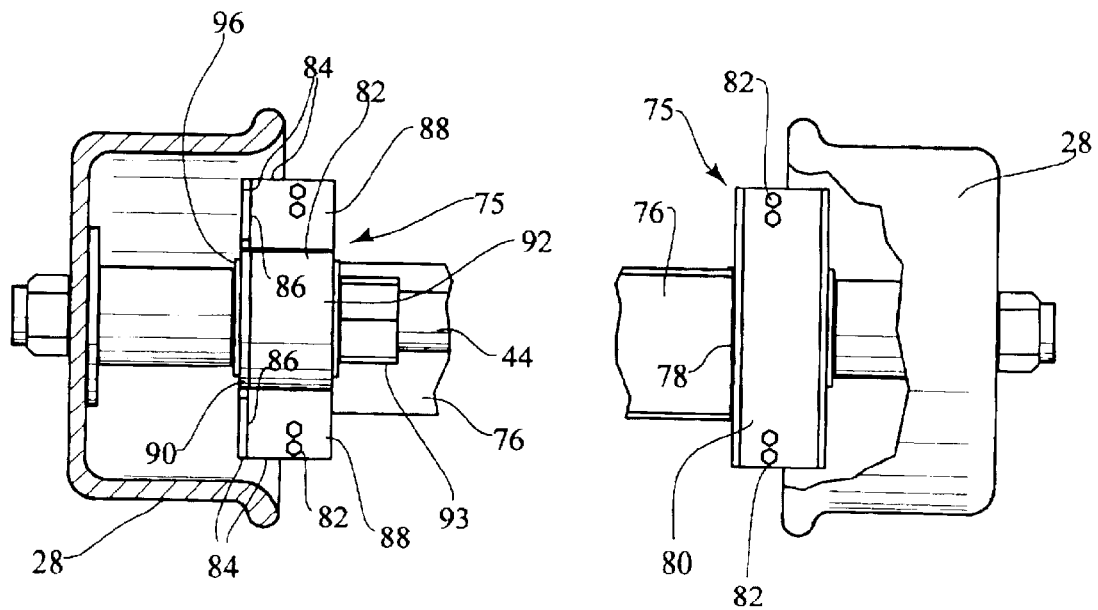
FIG. 7 shows a cross-sectional view of still another portion of the apparatus of FIGS. 1–6, as viewed along cross-section lines 7—7 of the latter mentioned figure.
FIG. 8. shows a peripheral view of a railroad wheel and portions of the support structure of the apparatus of FIGS. 1–7, as viewed along viewing lines 8—8 of FIG. 6, with a certain part torn away for viewing internal structure.

Referring now specifically to FIGS. 3–4, the chain 42 can be of the endless bicycle type and is strung between a follower sprocket 65, mounted for rotation on and with the axle 46, and a drive sprocket 67, mounted for rotation on and with the drive axle 44 of the wheels 28. Tension in the chain 42 can be increased or decreased by movement of a suitable tension gear 68 along an elongated slot 70 formed through a plate 71 and an opposing side of a channel member 72. The plate 71 is welded to the opposing side of the channel 72 and the latter is, in turn, seated upon and welded to an upper surface of one of the side beams 39 nearest the chain 42. As best seen in FIG. 3, a portion of the channel 72 and the attached plate 71 project outwardly away from a side of the beam 39 to which they are connected to assure clearance of the chain 42 and sprockets 65, 67 from that beam. A bolt 73 extends through the tension gear 68 and the slot 70 in the plate 71 and opposing side of the channel 72. By loosening the bolt 73, it and the tension gear 68 can be moved along the slot 70 to increase or decrease tension in the chain 42. By removing the effect of the tension gear 68 on the chain 42, as by loosening its bolt 73 and sliding it and tension gear along the slot 70, fully to the right as viewed, the chain 42 can be loosened and removed from the sprockets 65 and 67. By moving the bolt 73 and the tension gear 68 toward the left, as viewed, the chain 42 can be tightened to render it operative on the sprockets 65 and 67, as in the position shown in FIG. 4. The bolt 73 is then tightened to secure it and the tension gear 68 in the desired operative position against the chain 42.

Referring now to FIGS. 3 and 5–8, a support structure, generally designated 75, for supporting a lower output end portion of the roller conveyor 36 over the railroad wheels 28 and axle 44 is shown. A lower surface of the roller conveyor side beams 39 rests essentially flush on an upper side of an elongated channel member or cross beam 76. The cross beam 76 is welded, bolted or otherwise suitably secured to the underside of the two side beams 39 at their intersections. Opposite ends of the cross beam 76 are welded to opposing sides 78 of a pair of channel elements 80, each of which elements is located partially within a different one of the wells of the wheels 28 (See FIG. 8).

The cross beam 76 thus extends parallel to and spaced apart from the axle 44 of the wheels 28. Upper and lower end portions of each of the channel elements 80 are, in turn, removably connected, as by bolts 82, to a pair of angle brackets 84. See FIGS. 5–7. Each of the angle brackets 84 have a triangularly shaped side plate 86, located in planes parallel to the tracks 24, and a rectangular shaped front plate 88 extending at a right angle to the side plate 86. The front plates 88 mount flush against upper and lower rear surfaces of the channel elements 80 and are adjoined thereto by the bolts 82 as previously indicated. The side plates 86 are welded to opposing edges of a rectangular plate 90 (See FIGS. 5–7), each of the rectangular plates thus lying in the same plane between pairs of the adjoining side plates. A bearing housing 92, through which the wheel axle 44 extends, is welded to each of the plates 90 and its translational position along the axle 44, together with that of the remaining attached support structure 75, is held in fixed position by bolted ring clamps 93 (See FIG. 6). While the axle 44 rotates with the wheels 28, the support structure 75 remains fixed in the position shown with the wheel axle rotating therethrough on bearings 96.

Although the present invention has been shown and described with respect to specific details of a certain preferred embodiment thereof, it is not intended that such details limit the scope and coverage of this patent other than as expressly set forth in the following claims, taking into consideration modifications which are equivalent thereto.

I claim:

1. An apparatus for depositing tie plates from a mobile railroad track mounted tie plate carrier vehicle onto and along a railroad track, said apparatus comprising:

a gravity feed roller conveyor having an upper input end mounted on the output end of the carrier vehicle for receiving a succession of tie plates thereon, said roller conveyor extending diagonally downwardly and away from the carrier vehicle such that the succession of tie plates received thereon will gravitate downwardly thereon, a lower end portion of said roller conveyor being disposed on support structure carried on railroad wheels which are adapted for movement along the track with movement of the carrier vehicle; and a device mounted over an output end portion of said roller conveyor for intercepting each of the tie plates in succession as it gravitates downwardly to a preselected position on said roller conveyor for successively discharging each of the tie plates from a lower output end of said roller conveyor onto the railroad track in a preselected spaced apart manner as a function of the movement of said railroad wheels along the railroad track.

2. The apparatus of claim 1 further comprising a motorized, first conveyor mounted on said carrier vehicle for transporting a succession of tie plates deposited thereon to an output end of the carrier vehicle for deposition on the upper input end of said roller conveyor.

3. The apparatus of claim 1 wherein said device comprises an inflatable tire mounted on a first axle for rotation in an angular direction which is opposite that of a series of rollers of the roller conveyor along which the tie plates move, said tire being responsively connected to a second axle of said railroad wheels for rotation as a preset function of the rotation of said railroad wheels, said tire being adapted to bear against each of the tie plates successively and release each to the track upon a complete rotation thereof over each of the tie plates.

4. The apparatus of claim 2 further comprising an electric drive motor for operating said first conveyor and an engine powered generator, separate from an engine electric power generating system of the carrier, so as to prevent discharging of a battery in an electrical system of said carrier vehicle due to operation of said drive motor.

5. The apparatus of claim 3 wherein said tire comprises a gas filled tire.

6. The apparatus of claim 5 further comprising a follower sprocket gear mounted for rotation on and with said first axle, a drive sprocket gear mounted for rotation on and with said second axle and an endless drive chain mounted over and between said follower sprocket gear and said drive sprocket gear such that rotation of said second axle causes rotation of said first axle.

7. The apparatus of claim 3 further comprising support structure for the lower end portion of said roller conveyor including a cross-member extending parallel to and spaced apart from said second axle, a lower surface of said roller conveyor being seated on and attached to said cross-member, said cross-member being mounted to and between a pair of stationary bearing housings through which said second axle rotatably extends for connection to and rotation with said wheels, and a clamp for releasably fixing a translational position of said bearing housing cross-member along said second axle.

8. The apparatus of claim 7 wherein said support structure further comprises a pair of channel elements connected on opposing sides thereof to opposite ends of said cross beam and a pair of angle brackets, each of said brackets having one side connected to a different one of said channel elements and an adjacent side connected to a corresponding one of said housings.

9. A method for depositing tie plates in a spaced apart sequence along a bed of a railroad track from a mobile tie plate carrier vehicle mounted on said track, the steps of which comprise:

providing a gravity feed roller conveyor, an upper end portion of which is mounted in a tie plate receiving position on the carrier vehicle, a lower tie plate discharging end portion of said roller conveyor being attached to support structure carried by a pair of railroad wheels mounted on the track for movement along the track with the carrier vehicle;

loading the tie plates, one after another, on the upper end portion of said roller conveyor such that the tie plates gravitate toward the lower end portion of the roller conyener and away from the carrier vehicle;

capturing each of the tie plates separately and in sequence as it gravitates down said roller conveyor to a preselected position on said roller conveyor near a discharge end of said lower end portion; and releasing each of the tie plates, following the step of capturing it, at a predetermined release rate which depends on the distance traveled along the track by said pair of wheels since release of an immediately preceding one of the tie plates such that successive ones of the tie plates being released gravitate off of said discharge end onto the track bed at predetermined, spaced apart positions as the carrier vehicle and conveyor move along the track.

10. The method of claim 9, the steps of which further comprise providing a motorized endless belt conveyor on the carrier vehicle for discharging the tie plates placed thereon from storage on the carrier vehicle onto the upper end portion of the roller conveyor; and placing a series of the tie plates on the belt conveyor such that each of the tie plates so placed is discharged therefrom onto the roller conveyor, one after another.

* * * * *